(12) United States Patent
Ke

(10) Patent No.: US 11,307,786 B2
(45) Date of Patent: Apr. 19, 2022

(54) DATA STORAGE DEVICES AND DATA PROCESSING METHODS

(71) Applicant: Silicon Motion, Inc., Jhubei (TW)

(72) Inventor: Kuan-Yu Ke, Zhubei (TW)

(73) Assignee: Silicon Motion, Inc., Hsinchu County (TW)

(*) Notice: Subject to any disclaimer, the term of this patent is extended or adjusted under 35 U.S.C. 154(b) by 112 days.

(21) Appl. No.: 16/849,333

(22) Filed: Apr. 15, 2020

(65) Prior Publication Data
US 2020/0393964 A1 Dec. 17, 2020

(30) Foreign Application Priority Data

Jun. 17, 2019 (TW) ................................. 108120838

(51) Int. Cl.
*G06F 3/06* (2006.01)
*G06F 16/11* (2019.01)

(52) U.S. Cl.
CPC ............ *G06F 3/064* (2013.01); *G06F 3/0604* (2013.01); *G06F 3/0656* (2013.01); *G06F 3/0659* (2013.01); *G06F 3/0679* (2013.01); *G06F 16/11* (2019.01)

(58) Field of Classification Search
CPC ........ G06F 3/064; G06F 3/0604; G06F 16/11; G06F 3/0659; G06F 3/0679; G06F 3/0656; G06F 3/165; G06F 3/061; G06F 3/0658
See application file for complete search history.

(56) References Cited

U.S. PATENT DOCUMENTS

| | | | |
|---|---|---|---|
| 2006/0129749 A1* | 6/2006 | Nakanishi | G06F 3/0613 711/103 |
| 2006/0184723 A1* | 8/2006 | Sinclair | G06F 3/0652 711/103 |
| 2007/0033364 A1* | 2/2007 | Maeda | G06F 3/0643 711/170 |
| 2010/0217926 A1* | 8/2010 | Sinclair | G06F 3/0643 711/103 |
| 2010/0250839 A1* | 9/2010 | Ito | G06F 3/0643 711/103 |
| 2011/0029741 A1* | 2/2011 | Kuo | G06F 12/0246 711/154 |

* cited by examiner

*Primary Examiner* — Francisco A Grullon
(74) *Attorney, Agent, or Firm* — Winston Hsu

(57) ABSTRACT

A data storage device includes a memory device and a memory controller. The memory controller configures a first predetermined memory block and a second predetermined memory block as buffers to receive data from a host device and determines to use the first or the second predetermined memory block to receive the data according to write addresses of a write command received from the host device. When the write addresses indicate that the data to be written by the host device is management data of a file system of the host device, the memory controller writes the data to the first predetermined memory block. When the write addresses indicate that the data to be written by the host device is not the management data of the file system of the host device, the memory controller writes the data to the second predetermined memory block.

10 Claims, 4 Drawing Sheets

DATA STORAGE DEVICES AND DATA PROCESSING METHODS

CROSS REFERENCE TO RELATED APPLICATIONS

This Application claims priority of Taiwan Patent Application No. 108120838, filed on Jun. 17, 2019, the entirety of which is incorporated by reference herein.

BACKGROUND OF THE INVENTION

Field of the Invention

The invention relates to a data storage device and a data processing method capable of effectively processing data stored in the memory device and improving the access performance of the memory device.

Description of the Related Art

With the rapid growth of data storage technology in recent years, many data storage devices—such as memory cards manufactured in compliance with the SD/MMC standards, CF standards, MS standards or XD standards, as well as solid state hard drives, Embedded Multi Media Cards (eMMC) and Universal Flash Storage (UFS)—have been used widely for a variety of purposes. Therefore, effective control of access to these data storage devices is an important issue.

In order to improve the access performance of the data storage device, a novel data processing method which is capable of effectively processing data stored in the memory device and improving the access performance of the memory device, is proposed.

BRIEF SUMMARY OF THE INVENTION

Data storage devices and data processing methods are provided. An exemplary embodiment of a data storage device comprises a memory device and a memory controller. The memory controller comprises a plurality of memory blocks. The memory controller is coupled to the memory device and configured to access the memory device. The memory controller is configured to configure a first predetermined memory block and a second predetermined memory block as buffers to receive data from a host device and configured to determine to use the first predetermined memory block or the second predetermined memory block to receive the data according to one or more write addresses corresponding to a write command received from the host device. When the write addresses indicate that the data to be written by the host device is management data of a file system of the host device, the memory controller is configured to write the data to the first predetermined memory block, and when the write addresses indicate that the data to be written by the host device is not the management data of the file system of the host device, the memory controller is configured to write the data to the second predetermined memory block.

An exemplary embodiment of a data processing method for a data storage device comprising a memory device and a memory controller, wherein the memory device comprises a plurality of memory blocks, and the memory controller is coupled to the memory device and configured to access the memory device. The method is performed by the memory controller and comprises: configuring a first predetermined memory block and a second predetermined memory block as buffers to receive data from a host device; and determining to use the first predetermined memory block or the second predetermined memory block to receive the data according to one or more write addresses corresponding to a write command received from the host device. The step of determining to use the first predetermined memory block or the second predetermined memory block to receive the data according to one or more write addresses corresponding to a write command received from the host device further comprises: writing the data to the first predetermined memory block when the write addresses indicate that the data to be written by the host device is management data of a file system of the host device; and writing the data to the second predetermined memory block when the write addresses indicate that the data to be written by the host device is not the management data of the file system of the host device.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof. The scope of the invention is determined by reference to the appended claims.

Figure 1:
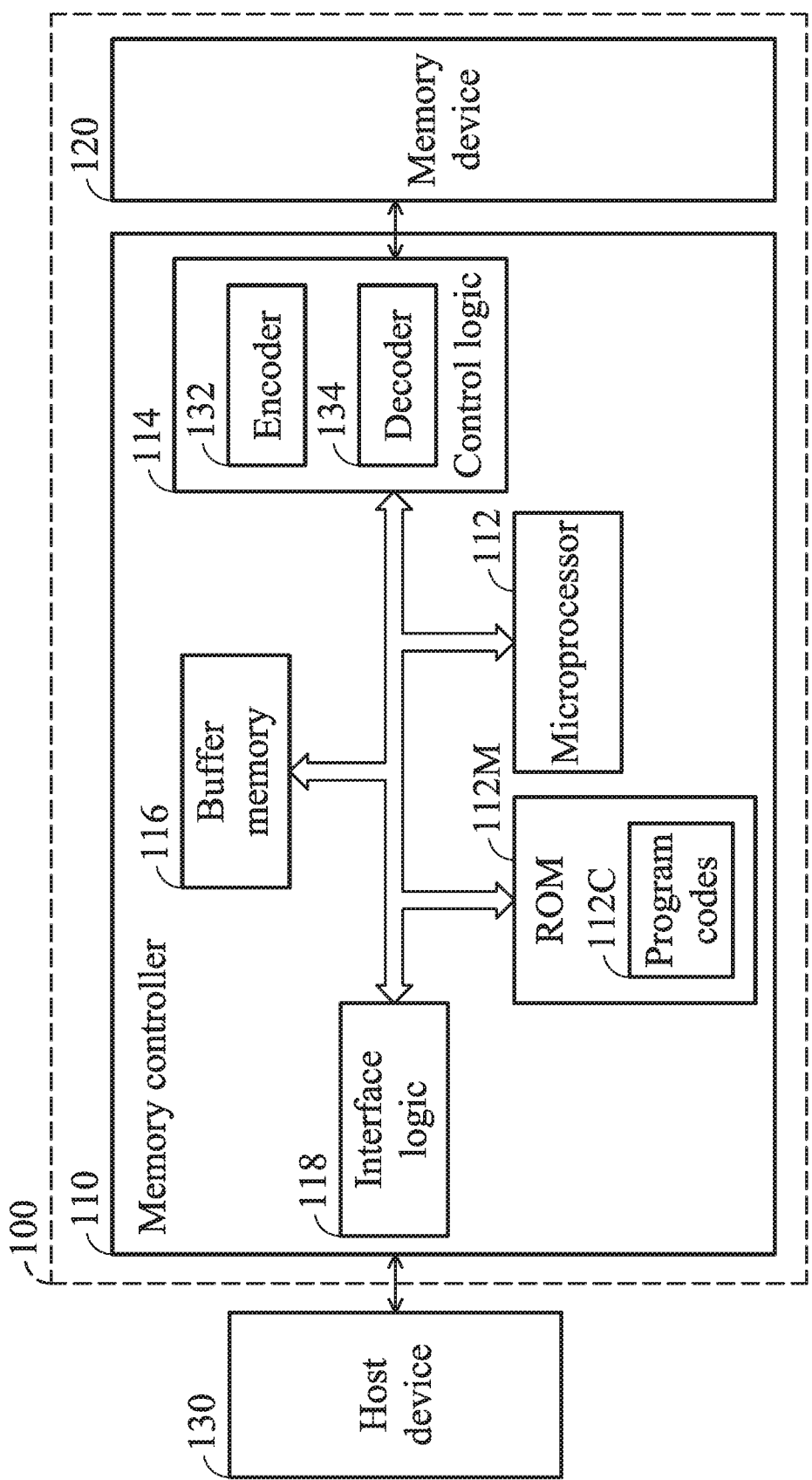
FIG. 1 shows an exemplary block diagram of a data storage device according to an embodiment of the invention.

FIG. 1 shows an exemplary block diagram of a data storage device according to an embodiment of the invention. The data storage device 100 may comprise a memory device 120, such as a flash memory module, and a memory controller 110. The memory controller 110 is configured to access the memory device 120. According to an embodiment of the invention, the memory controller 110 may comprise a microprocessor 112, a Read Only Memory (ROM) 112M, a control logic 114, a buffer memory 116 and an interface logic 118. The ROM 112M is configured to store program codes 112C. The microprocessor 112 is configured to execute the program codes 112C, thereby controlling access to the memory device 120. The control logic 114 may comprise an encoder 132 and a decoder 134. The encoder 132 is configured to encode the data to be written into the memory device 120 so as to generate corresponding correcting/checking code (also called error correction code (ECC)). The decoder 134 is configured decode the data read out from the memory device 120.

Typically, the memory device 120 may comprise a plurality of flash memory chips, and each flash memory chip may comprise a plurality of memory blocks. The access unit of an erase operation performed by the controller (e.g., the memory controller 110, through the execution of the program codes 112C by the microprocessor 112) on the memory device 120 may be one memory block. In addition, a memory block may record (comprise) a predetermined number of pages, that is, the physical pages, and the access unit of a write operation performed by the controller (e.g., the memory controller 110, through the execution of the program codes 112C by the microprocessor 112) on the memory device 120 may be one page.

In practice, the memory controller 110 may perform various control operations by using its own internal components through the execution of the program codes 112C by the microprocessor 112. For example, the memory controller 110 may use the control logic 114 to control the access operations (especially the access operation for at least a memory block or at least a page) of the memory device 120, use the buffer memory 116 to perform necessary data buffer operations, and use the interface logic 118 to communicate with a host device 130. In an embodiment of the invention, the memory controller 110 may use the interface logic 118 to communicate with a host device 130 in compliance with a standard communication protocol. For example, the standard communication protocol may comprise (but is not limited to) the Universal Serial Bus (USB) standard, the Secure Digital (SD) interface standard, the Ultra High Speed-I (UHS-I) interface standard, the Ultra High Speed-II (UHS-II) interface standard, the Compact Flash (CF) interface standard, the Multimedia Card (MMC) interface standard, the Embedded Multimedia Card (eMMC) interface standard, the Universal Flash Storage (UFS) interface standard, the Advanced Technology Attachment (ATA) standard, the Serial ATA (SATA) standard, the Peripheral Component Interconnect Express (PCI-E) standard, the Parallel Advanced Technology Attachment (PATA) standard, etc.

In an embodiment, the buffer memory 116 may be implemented by a Random Access Memory (RAM). For example, the buffer memory 116 may be an SRAM, but the invention should not be limited thereto.

In an embodiment of the invention, the data storage device 100 may be a portable storage device (for example, the memory card in compliance with the SD/MMC, CF, MS and/or XD standard), and the host device 130 may be an electronic device, such as a mobile phone, a notebook computer, a desktop computer . . . etc., capable of connecting to the data storage device. In another embodiment of the invention, the data storage device 100 may be a solid state hard disk or an embedded storage device in compliance with the Universal Flash Storage (UFS) or the Embedded Multi Media Card (EMMC) standards, and may be equipped in an electronic device such as a mobile phone, a notebook computer, or a desktop computer. In such an embodiment, the host device 130 may be a processor of the electronic device.

The host device 130 may issue commands, such as the read command or the write command, to the data storage device 100, so as to access the data stored in the memory device 120, or the host device 130 may issue commands to further control or manage the data storage device 100.

According to an embodiment of the invention, the memory blocks comprised in the memory device 120 may be configured as the Single-Level Cell (SLC) memory blocks, the Multiple-Level Cell (MLC) memory blocks and/or the Triple-Level Cell (TLC) memory blocks. The memory cell of the SLC memory block is configured to store one bit of data, the memory cell of the MLC memory block is configured to store two bits of data, and the memory cell of the TLC memory block is configured to store three bits of data.

Generally, the memory device 120 may be divided into three regions, comprising a system region, a data region and a spare region. The memory controller 110 is configured to select one or more predetermined memory blocks from the spare region as the cache memories, which may also be called buffers, to receive data and buffer the data. When a predetermined memory block (that is, the buffer) is full (that is, has been fully written with data), the memory controller may further update the predetermined memory block currently being utilized as a buffer as a data block in the data region. For example, when the predetermined memory block currently being utilized as a buffer to receive data is an MLC or a TLC memory block, when the buffer is full, the predetermined memory block may be directly updated as a data block in the data region. When the predetermined memory block currently being utilized as a buffer to receive data is an SLC memory block, when a predetermined number of buffers are full, the memory controller may perform a garbage collection procedure to move the data stored in the buffers to an MLC or a TLC memory block (the destination memory block) and update the destination memory block as a data block in the data region.

The proposed data processing method may be applied to the data storage device using dual buffers to receive data. According to an embodiment of the invention, the memory controller 110 may configure a first predetermined memory block and a second predetermined memory block as buffers to receive data from a host device 130. Before writing the data into the buffers, the memory controller 110 is configured to perform the determination for shunting the data, so that the management data of the file system of the host device 130 will be written in the first predetermined memory block and the other data will be written in the second predetermined memory block.

According to an embodiment of the invention, the memory controller 110 may divide the data to be written into the memory device 120 by the host device 130 into the management data of the file system and the user data. The management data of the file system is the management data of the file system utilized by the operating system (OS) operated in the host device 130. The management data may be a file system management table. The file system management table may comprise a plurality of fields for recording the management information of the user data. For example, one field of the file system management table may record the size of each file of the user data and the range of logical addresses of the corresponding user data, where one file may correspond to one record. In another example, another field of the file system management table may record which logical addresses of the host device system have already been written with data, and which logical addresses of the host device system have not been written with data. According to an embodiment of the invention, the host device system may be a system comprising the host device 130 and the data storage device 100, or may be a system further comprising one or more peripheral devices coupled to the host device 130.

Generally, when the user data is updated, the host device 130 has to accordingly update the management data of the file system, so that the information recorded in the file system management table is the latest management information. When any field in the file system management table has to be updated, the memory controller 110 is configured to write the latest content of the file system management table into the memory device 120. However, frequently updating the file system management table may cause a lot of file system management tables previously stored in the memory device 120 to become invalid, and may further cause the memory controller 110 to have to trigger a garbage collection procedure.

The "Garbage Collection" is operative to collect valid data distributed over several memory blocks and move the collected valid data to a specific memory block. After performing the garbage collection procedure, the memory blocks containing only invalid data can be erased and released as spare memory blocks. However, performing the garbage collection procedure usually requires considerable resources for calculation. Therefore, access performance of the memory device will be degraded when of the garbage collection procedure is frequently performed. In order to prevent the access performance of the memory device from being degraded due to frequently performing the garbage collection procedure, a novel data processing method which is capable of effectively processing data stored in the memory device and improving the access performance of the memory device is proposed.

Figure 2:
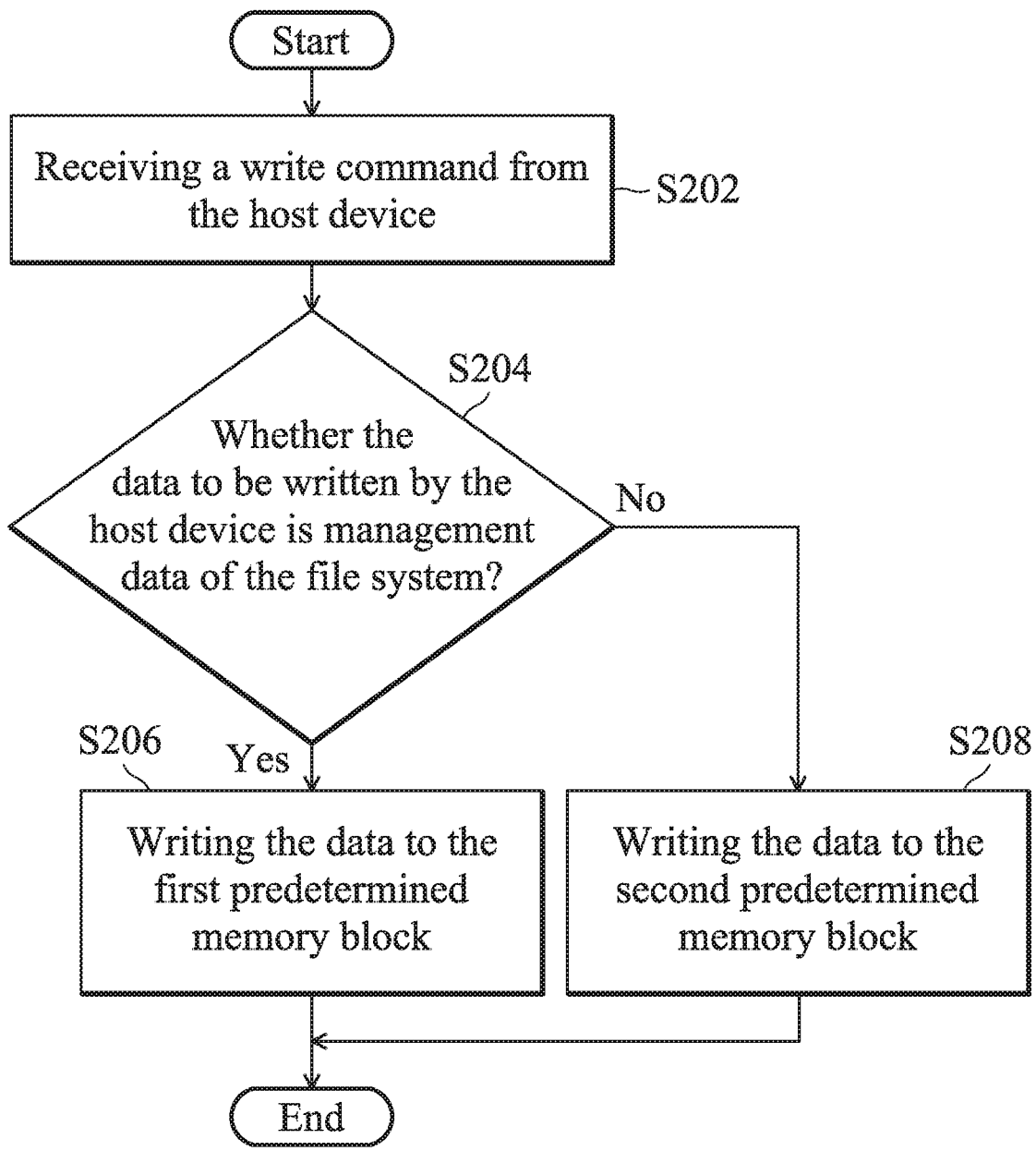
FIG. 2 is an exemplary flow chart of a data processing method according to an embodiment of the invention.

FIG. 2 is an exemplary flow chart of a data processing method according to an embodiment of the invention. When the memory controller 110 receives a write command instructing the memory controller 110 to write data to the memory device 120 from the host device 130 (Step S202), the memory controller 110 may further determine to use the first predetermined memory block or the second predetermined memory block to receive the data according to one or more write addresses corresponding to the write command. According to an embodiment of the invention, the memory controller 110 may determine whether the data to be written by the host device 130 is the management data of the file system of the host device 130 according to one or more write addresses corresponding to the write command (Step S204).

If so, the memory controller 110 is configured to write the data to the first predetermined memory block (Step S206). If not, the memory controller 110 is configured to write the data to the second predetermined memory block (Step S208). In this manner, the data can be shunted by the memory controller 110 before being written into the buffers, resulting in that the management data of the file system is collected in one memory block and the remaining data is collected in another memory block. According to an embodiment of the invention, since the management data of the file system is collected in one memory block, for example, the first predetermined memory block as discussed above, or a data block of the data region updated from the first predetermined memory block when the first predetermined memory block is full, or a destination memory block (which may also be a data block in the data region) utilized for collecting the data stored in the first predetermined memory block, when the data stored in the pages of this memory block becomes invalid (that is, all the pages in this memory block becomes invalid pages), the memory controller 110 may directly discard this memory block and does not have to perform garbage collection on this memory block. In this manner, the performance of the memory device can be greatly improved.

According to an embodiment of the invention, the write addresses corresponding to the write command may be the logical addresses. For example, the Logical Block Address (LBA), or the logical address of the logical page of the host device system recorded in other format.

According to an embodiment of the invention, the memory controller 110 may set a predetermined value for determining whether the data to be written by the host device 130 is the management data of the file system of the host device 130. In step S204, the memory controller 110 may determine whether the value corresponding to a write address is less than the predetermined value. Generally, the host device 130 may assign the logical addresses having small values (for example, assigning from the beginning of the logical addresses) for the use of storing the management data of the file system. Therefore, according to an embodiment of the invention, when the value (for example, the logical address) corresponding to a write address is less than the predetermined value, the memory controller 110 may determine that the data to be written by the host device 130 is the management data of the file system of the host device 130. On the contrary, when the value (for example, the logical address) corresponding to a write address is not less than the predetermined value, the memory controller 110 may determine that the data to be written by the host device 130 is the user data.

It should be noted that in the embodiments of the invention, the host device 130 is not limited to assign the logical addresses having small values to the management data of the file system. For example, the host device 130 may assign the logical addresses having large values (for example, assigning from the end of the logical addresses) to the management data of the file system. Therefore, the invention should not be limited to the specific method for identifying the management data as discussed above.

According to another embodiment of the invention, the host device 130 may set a specific range of logical addresses and assign the logical addresses in this specific range for the use of storing the management data of the file system. Therefore, according to an embodiment of the invention, when a value (for example, the logical address) corresponding to a write address falls within the specific range of logical addresses, or when a write address is in a range of logical addresses configured by the host device for storing the management data of the file system of the host device 130, the memory controller 110 may determine that the data to be written by the host device 130 is the management data of the file system of the host device 130. On the contrary, when the value (for example, the logical address) corresponding to a write address does not fall within the specific range of logical addresses, the memory controller 110 may determine that the data to be written by the host device 130 is the user data.

According to an embodiment of the invention, the host device 130 may notify the memory controller 110 of the logical addresses or the range of logical addresses assigned for storing the management data of the file system. As discussed above, the memory controller 110 may communicate with the host device 130 via the interface logic 118.

Figure 3:
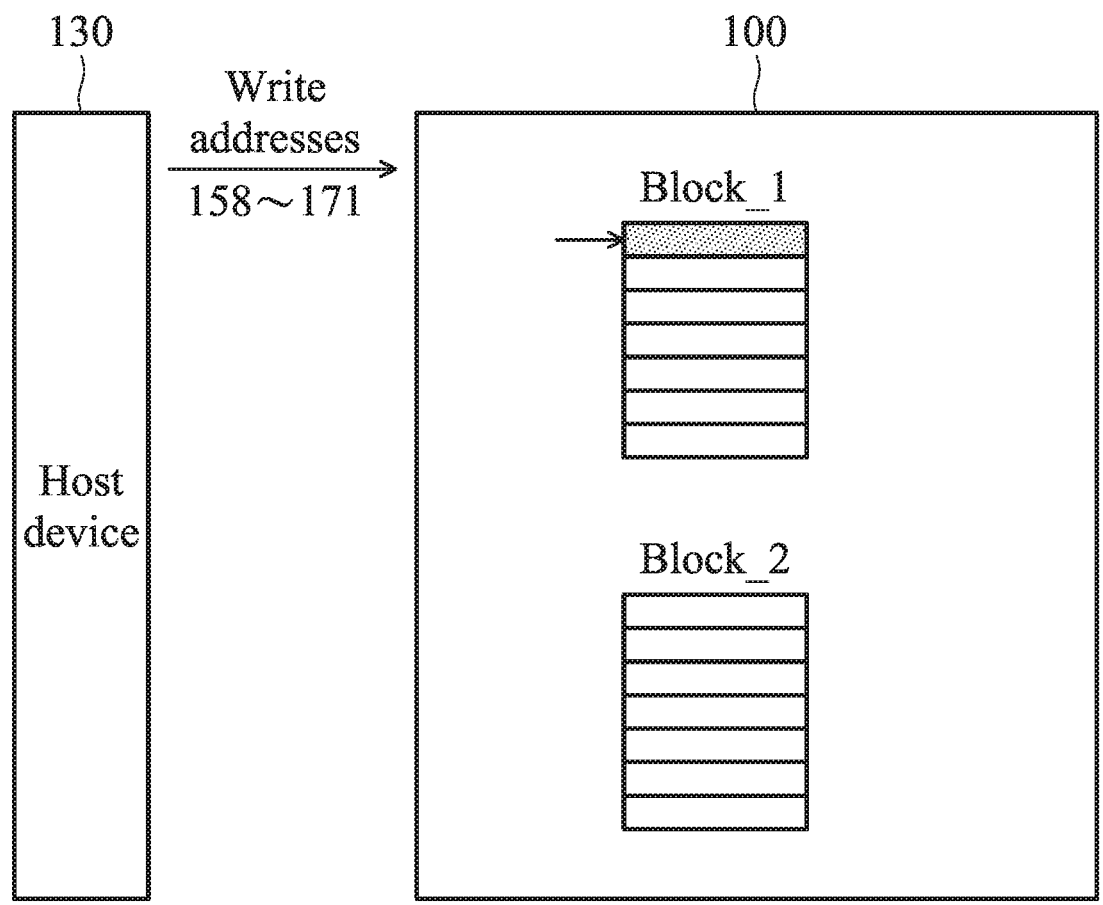
FIG. 3 is a schematic diagram showing the shunting of the data based on the write address according to an embodiment of the invention.
Figure 4:
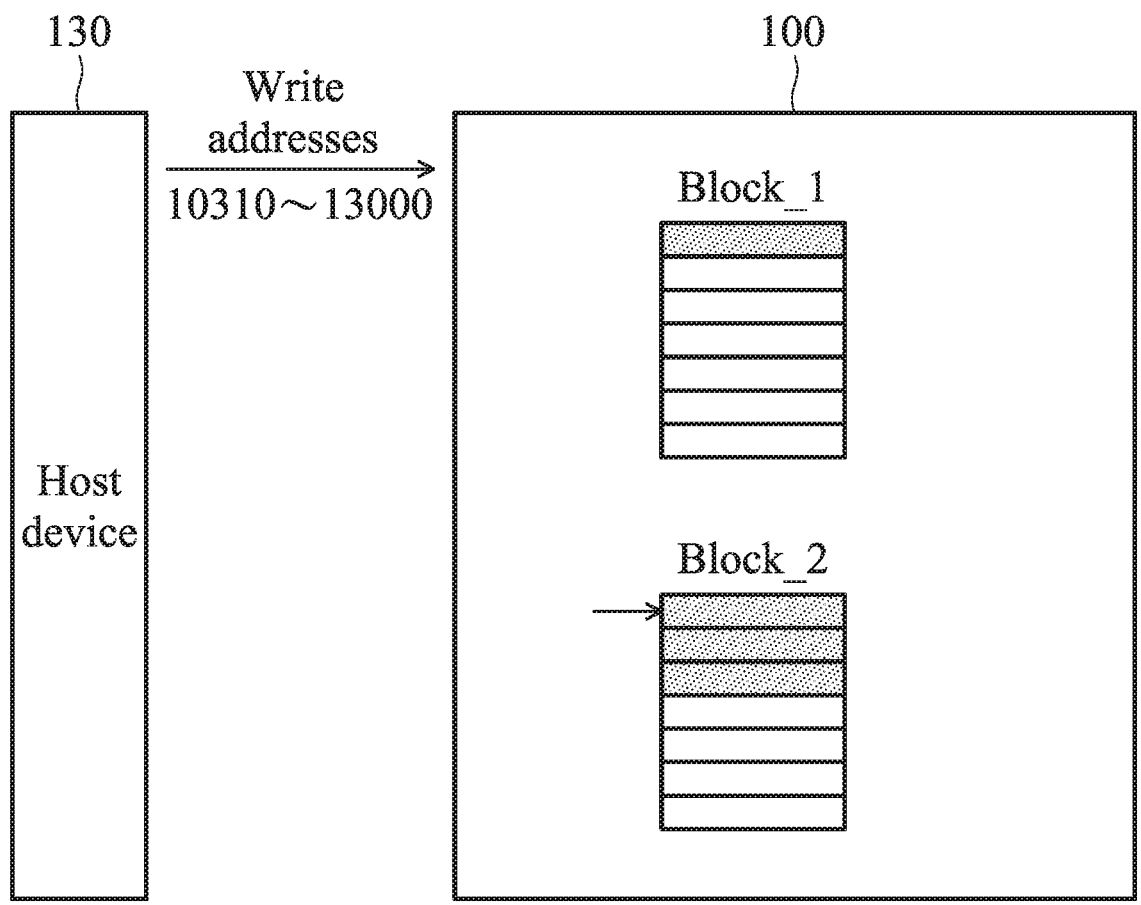
FIG. 4 is another schematic diagram showing the shunting of the data based on the write address according to an embodiment of the invention.

FIG. 3 is a schematic diagram showing the shunting of the data based on the write address according to an embodiment of the invention. FIG. 4 is another schematic diagram showing the shunting of the data based on the write address according to an embodiment of the invention. In this embodiment, the memory controller 110 may set the predetermined value as 10000. As shown in FIG. 3, when the memory controller 110 determines that the write address (logical address) is less than 10000, the memory controller 110 determines to use the first predetermined memory block Block_1 to receive data, so that the management data of the file system will be stored in the first predetermined memory block Block_1. On the other hand, as shown in FIG. 4, when the memory controller 110 determines that the write address (logical address) is not less than 10000, the memory controller 110 determines to use the second predetermined memory block Block_2 to receive data, so that the data other than the management data of the file system will be stored in the second predetermined memory block Block_2.

According to an embodiment of the invention, when the memory controller 110 selects the predetermined memory block as the buffer to receive data, the memory controller 110 may determine to use the SLC mode or the MLC mode to erase the data in the selected predetermined memory block. When the memory controller 110 erases the predetermined memory block by an SLC mode, the predetermined memory block is configured as an SLC memory block. Similarly, when the memory controller 110 erases the predetermined memory block by an MLC mode, the predetermined memory block is configured as an MLC memory block. According to an embodiment of the invention, the memory controller 110 may configure the memory block utilized for receiving the management data of the file system as an SLC memory block and may configure the memory block utilized for receiving the other data as an MLC memory block.

Since the management information of the file system is important information, the memory controller 110 may determine to use the SLC memory block to receive the management information of the file system, so as to ensure the correctness of the management data. In addition, since the speed of writing data to the SLC memory block is faster than the speed of writing data to the MLC memory block, using the SLC memory block as the buffer can further speed up the write operation of the memory device 120. However, the invention is not limited thereto. The memory controller 110 may also configure the memory block utilized to receive the management data of the file system as the MLC memory block and configure the memory block utilized to receive the other data as the SLC memory block, or may configure both the aforementioned first predetermined memory block and second predetermined memory block as the SLC memory blocks, or may configure both the aforementioned first predetermined memory block and second predetermined memory block as the MLC memory blocks.

In addition, the invention is not limited to be only applied to the data storage device using dual buffers to receive data. The data storage device may also use more than two buffers to receive data, wherein one of them is configured to receive the management data of the file system and the remaining buffers are configured to receive the other data.

As discussed above, in the embodiments of the invention, before the data is written to the buffer, the memory controller 110 is configured to determine to write the data to which buffer, so that the management data of the file system of the host device 130 will be written into the first predetermined memory block and the remaining data will be written into the second predetermined memory block. Since the management data of the file system is collected in the same memory block, when all the data stored in this memory block becomes invalid, the memory controller 110 may directly discard this memory block and does not have to perform garbage collection on this memory block. In this manner, the degradation of the access performance of the memory device due to frequently performing the garbage collection procedure can be avoided and the performance of the memory device can be greatly improved.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A data storage device, comprising:
  a memory device, comprising a plurality of memory blocks; and
  a memory controller, coupled to the memory device and configured to access the memory device,
  wherein the memory controller is configured to configure a first predetermined memory block and a second predetermined memory block as buffers to receive data from a host device and configured to determine to use the first predetermined memory block or the second predetermined memory block to receive the data according to one or more write addresses corresponding to a write command received from the host device,
  wherein when the one or more write addresses indicate that the data to be written by the host device is management data of a file system of the host device, the memory controller is configured to write the data to the first predetermined memory block, and when the one or more write addresses indicate that the data to be written by the host device is not the management data of the file system of the host device, the memory controller is configured to write the data to the second predetermined memory block, and
  wherein when a value corresponding to a write address is less than a predetermined value, the memory controller determines that the data to be written by the host device is the management data of the file system of the host device.

2. The data storage device as claimed in claim 1, wherein the one or more write addresses are logical addresses.

3. The data storage device as claimed in claim 1, wherein when a value corresponding to a write address falls within a range of logical addresses configured by the host device for storing the management data of the file system of the host device, the memory controller determines that the data to be written by the host device is the management data of the file system of the host device.

4. The data storage device as claimed in claim 1, wherein the management data of the file system is a file system management table.

5. The data storage device as claimed in claim 1, wherein the memory device is a flash memory device.

6. A data processing method for a data storage device comprising a memory device and a memory controller, wherein the memory device comprises a plurality of memory blocks, the memory controller is coupled to the memory device and configured to access the memory device, and the method is performed by the memory controller and comprises:

configuring a first predetermined memory block and a second predetermined memory block as buffers to receive data from a host device; and determining to use the first predetermined memory block or the second predetermined memory block to receive the data according to one or more write addresses corresponding to a write command received from the host device, wherein the step of determining to use the first predetermined memory block or the second predetermined memory block to receive the data according to one or more write addresses corresponding to a write command received from the host device further comprises:

writing the data to the first predetermined memory block when the one or more write addresses indicate that the data to be written by the host device is management data of a file system of the host device; and writing the data to the second predetermined memory block when the one or more write addresses indicate that the data to be written by the host device is not the management data of the file system of the host device, wherein when a value corresponding to a write address is less than a predetermined value, it is determined that the data to be written by the host device is the management data of the file system of the host device.

7. The data processing method as claimed in claim 6, wherein the one or more write addresses are logical addresses.

8. The data processing method as claimed in claim 6, wherein when a value corresponding to a write address falls within a range of logical addresses configured by the host device for storing the management data of the file system of the host device, the data to be written by the host device is determined as the management data of the file system of the host device.

9. The data processing method as claimed in claim 6, wherein the management data of the file system is a file system management table.

10. The data processing method as claimed in claim 6, wherein the memory device is a flash memory device.

* * * * *